United States Patent [19]

Lesche

[11] 4,396,214

[45] Aug. 2, 1983

[54] SPADE

[76] Inventor: Walter Lesche, 2016 Grant Ave., Bridgeton, N.J. 08302

[21] Appl. No.: 33,201

[22] Filed: Apr. 25, 1979

[51] Int. Cl.³ .................... A01B 1/02; B25G 3/26
[52] U.S. Cl. .................................. 294/49; 294/57
[58] Field of Search .................. 294/49, 51, 57, 60; 16/110 R, 114 R; 30/344; 76/113; 172/371, 375; 403/334, 361, 378, 379

[56] References Cited

U.S. PATENT DOCUMENTS

| 373,530 | 11/1887 | Maynard | 294/49 X |
| 600,260 | 3/1898 | Elder | 294/57 |
| 946,369 | 1/1910 | Judy | 294/49 X |
| 1,204,332 | 11/1916 | Archer | 294/57 X |
| 1,391,814 | 9/1921 | Wolfe | 294/51 |
| 2,380,361 | 7/1945 | Harte | 294/49 X |

FOREIGN PATENT DOCUMENTS

| 114267 | 3/1918 | United Kingdom | 294/49 |
| 1454223 | 11/1976 | United Kingdom | 294/57 |

Primary Examiner—Johnny D. Cherry
Attorney, Agent, or Firm—Thomas A. Lennox

[57] ABSTRACT

A spade with a replaceable blade with a tapered neck-socket connection with a spring pin lock. Footrest steps pitched downwardly on the blade to avoid the leg touching the tubular handle and an oversized two-handed tubular D-handle are provided.

10 Claims, 8 Drawing Figures

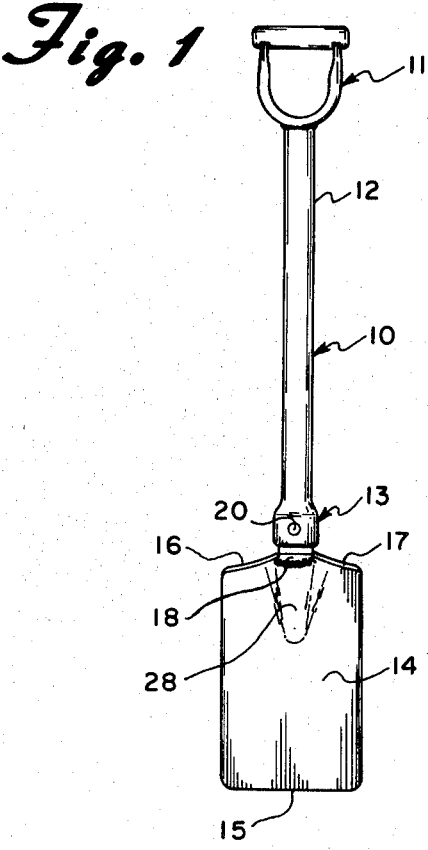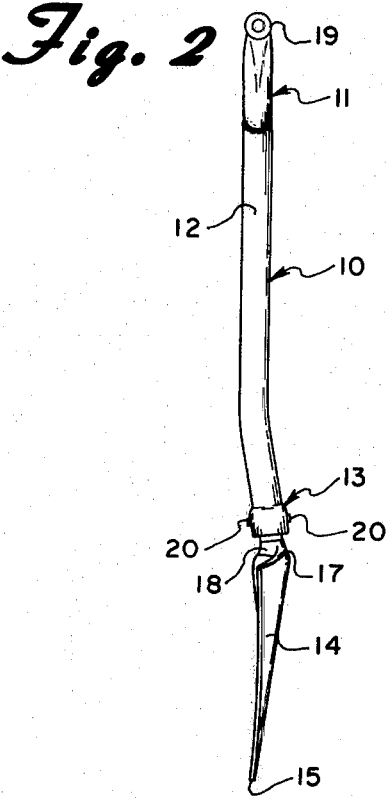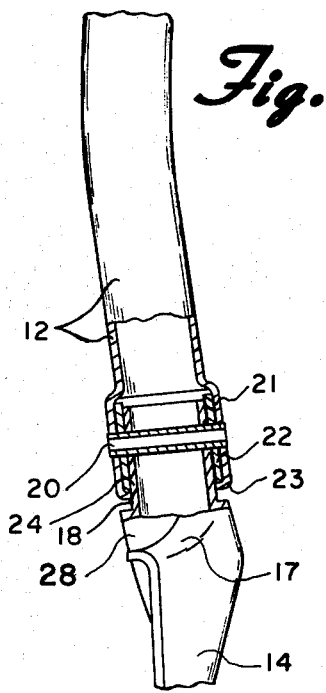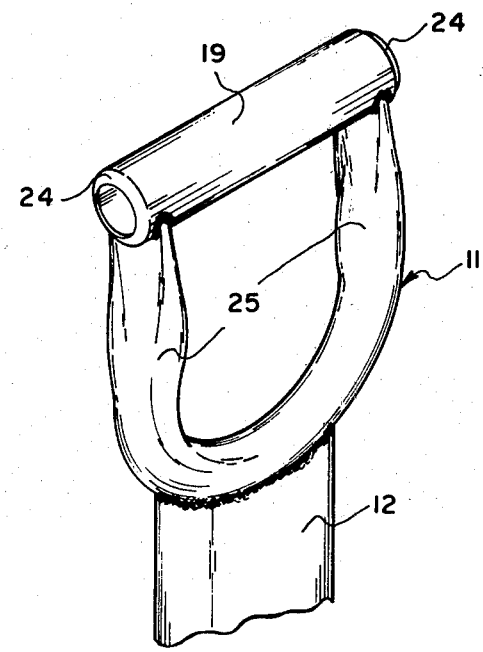

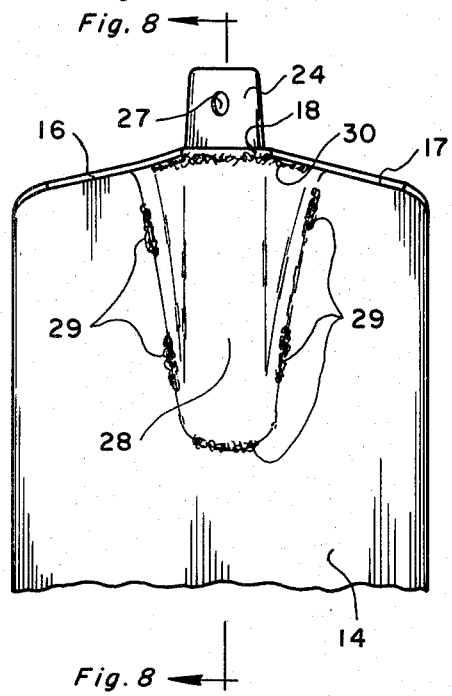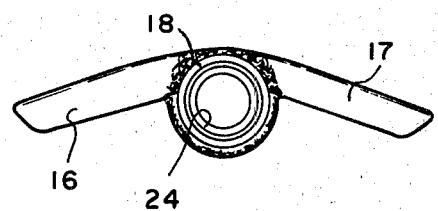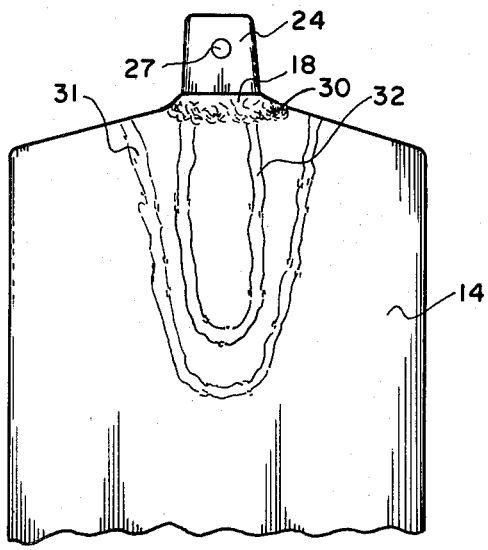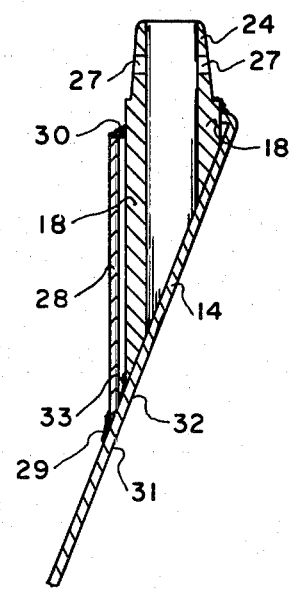

SPADE

BACKGROUND OF THE INVENTION

This invention relates to the field of spades, in particular those designed for heavy hand field use and particularly suited for gardeners and nurserymen who use the spade essentially every day. The spade should be distinguished from a shovel which is usually used on light unpacked materials. The spade, on the other hand, is designed to be forced into compressed earth and be strong enough to lift out and pry the earth from its settled position. When a spade is used by a nurseryman, it has been found that the blade may wear out before the handle wears out or breaks. In some instances, it appears that the handle has been designed to last only about as long as the spade blade. I propose that if the spade handle is properly designed and constructed, it is essentially indestructable. There are finite limits to the stress that can be applied by an individual and the necessary strength may be constructed into the handle system. I have also observed that none of the prior art spades have a handle designed and constructed for use of two hands at the same time. Having recognized these factors, I have considered the spades in the prior art and have found no devices to satisfy the needs in the industry. A typical spade, although called a shovel in this patent, is described in U.S. Pat. No. 204,897 to J. Johnson. A detachable shovel blade is described in U.S. Pat. No. 348,794 to Z. H. Smith and another shovel that may be taken apart is described in U.S. Pat. No. 701,805 to J. W. Ellison. The limitations on these structures will be apparent to a reader of this disclosure.

The typical spade used by the homeowner uses a wooden handle which is wedged into the socket welded or bolted to the spade blade. For the nurseryman, a wooden handle is not durable enough and not strong enough for his continued use. Manufacturers still offer spades of this construction, but failures are numerous and the nurseryman not only risks the loss of the spade to breakage but also risks personal injury when the break occurs.

The spades of the prior art also do not take into account the general use of the spade when it is forced into the ground by the nurseryman pressing on the footrest step along the top edge of the spade blade. Actually, I have found that the skilled nurseryman cannot place his foot flat on the rest without coming into contact with the tubular handle. Of necessity the nurseryman rests his foot on the outside corner of the top edge with the attendant risk to shoe and self.

It is an object of this invention to provide a spade with a detachable blade.

It is an additional object of this invention to provide a detachment mechanism which provides the strength and durability sufficient to withstand the hard use of a spade in industrial use.

It is an additional object of this invention to provide a spade blade construction which is reinforced and has sufficient strength to stand misuse.

It is an additional object of this invention to construct a spade with a handle system which will be essentially indestructable and with a spade blade that may be replaced when the end of the blade has worn down.

It is a further object of this invention to provide a spade handle that allows easy use of two hands to pry the earth up.

It is an additional object of this invention to provide a spade that allows foot pressure on the foot step of the blade in a sure footed fashion while avoiding interference with the handle during the pressing operation.

It is an additional object of this invention to provide an interlocking attachment system between the spade blade and the handle system which is sufficiently durable and permanent to allow years of use without failure.

SUMMARY OF THE INVENTION

My invention is a spade construction utilizing a grip handle, preferably a tubular "D" shape with a hand grip on the straight side of the D-shape. A handle body is rigidly and structurally attached to the grip handle extending essentially in the same plane of the grip handle. The free end of the tubular handle terminates in a socket, preferably tubular in shape. A spade blade is provided with a neck rigidly and structurally attached to the front face of the blade, preferably at a slight angle from a generally parallel position to that of the face of the blade with the free end of the neck being tapered and matched to friction fit into the socket. A locking means is provided to lock the tapered neck into the socket.

BRIEF DESCRIPTION OF THE DRAWINGS

FIG. 1 is a front view of the spade of this invention.

FIG. 2 is a side view of the spade of this invention.

FIG. 3 is an expanded partial cross-sectional view of the side of the interlock between the handle and the spade blade.

FIG. 4 is an expanded perspective view of the handle of the spade shown in FIG. 1.

FIG. 5 is a partial front view of the spade blade disconnected from the handle.

FIG. 6 is a top view of the spade blade shown in FIG. 5.

FIG. 7 is a partial back view of the spade blade shown in FIG. 5.

FIG. 8 is a cross-sectional view taken along lines 8—8 of FIG. 5.

DESCRIPTION OF PREFERRED EMBODIMENTS

The construction of the grip handle and the handle body is preferably tubular. The grip handle is preferably a tubular "D" shaped handle with a hand grip on the straight side, but also having straight tubular sections extending at right angles from the ends of the hand grip of sufficient size and diameter to allow the free hand an additional grip. The ends of these straight tubular sections are structurally connected into the curved portion of the grip handle to form an elongated "D" shape. The free end of the tubular handle body connected to the grip handle preferably terminates in a tubular socket. The preferable construction is a ring or cylindrical member force fitted inside the free end of the tubular handle.

Special footrest steps are preferably constructed on the top edges of the spade blade, one step on each side of the blade pitched downwardly toward the outside edge of the top of the spade blade. This pitch is chosen to be sufficient to avoid the inside of the user's knee from touching the tubular handle when the foot is pressed on the step. The pitch angle from the horizontal is more preferably in the range of five to twenty degrees and most preferably in the range of seven to fifteen degrees.

The tubular neck structurally attached to the front face of the blade at a relatively narrow convex angle from that face is preferably reinforced by a shield support cover which is structurally and rigidly attached to the front face of the blade covering the tubular neck, except for the portion extending above the top edge of the spade blade. The support cover member is also structurally and rigidly attached to the neck at the upper edge of the support cover.

The locking means to lock the tapered neck into the socket preferably includes a pair of off-set holes, one hole passing through both sides of the socket and the other hole passing through both sides of the tapered portion of the neck. A locking system, preferably a spring pin, inserted into the pairs of holes, locks the neck into the socket. The off-set between the holes is sufficient to pull the tapered neck into the socket when the locking system is inserted through the pair of holes.

In FIG. 1, spade 10 is shown with a heavily constructed elongated D-shape handle 11 welded to one and one-half inch O.D. seamless tubing 12 terminating in socket 13. Spade blade 14 is constructed of an 0.095 alloy steel sharpened at end 15 and heat formed at the opposite end to form footrest steps 16 and 17. Neck 18 is welded to the front base of blade 14 and is reinforced with shield support cover 28 welded to blade 14 and to neck 18.

In the side view of FIG. 2, hand grip 19 is shown as part of handle 11 and five-sixteenth inch spring roll pin 20 is shown extending through socket 13 to interlock neck 18 into socket 13.

In the close-up cross-sectional view of FIG. 3, the tubular handle 12 constructed of chromalloy 4130, one and one-half inch O.D., 18 gauge wedged out at 21 over socket 22 constructed of a one and one-half inch length of one and one-half inch O.D. seamless cold rolled low carbon steel tubing with a one-quarter inch wall. The inside surface is machined to form a one and one-half degree taper with the chromalloy tubing 12 flared over the end at end 23. Neck 18 is constructed of a one inch schedule 80 steel pipe with a one and one-half degree taper. Spring roll pin 20 is forced fitted through socket 22 and tapered neck 24, however the holes are actually off-set about one-sixteenth inch such that when pin 20 is force fitted through the holes tapered neck 24 is drawn into socket 22 and locks it in place.

In FIG. 4 grip handle 19 is constructed of one and three-sixteenth inch low carbon steel with a 0.062 inch thick wall beveled on ends 24 and welded on each end to a tubular "U" shape 25 of 0.875 diameter 14 gauge medium carbon manganese steel tubing. Shape 25 is structurally welded to tubing 12 to form a virtually indestructable handle 11.

In FIG. 5, most of blade 14 is shown from the front face showing footrest steps 16 and 17 angled at about ten degrees from the horizontal. Tapered neck 24 extends above neck 18 with holes 27 off-set downwardly from the holes in socket 22 when the parts are engaged. Shield support cover 28 is welded securely to blade 14 at edges 29 and welded to neck 18 at edge 30. The top view of FIG. 6 shows the width of steps 16 and 17 and the top of tapered neck 24.

In FIG. 7, the major portion of the back of spade blade 14 is shown having heaat distortion line 32. Shield support cover 28 is shown welded along line 29 to blade 14 directly opposite weld mark 31.

While my invention has been described with reference to the specific embodiments disclosed herein, it is not confined to the details set forth and the patent is intended to include modifications and changes which may come within and extend from the following claims.

I claim:
1. A spade comprising:
  (a) a grip handle with a hand grip on the top side
  (b) a handle body rigidly and structurally attached and extending from the grip handle,
  wherein the free end of the handle body terminates in a socket,
  (c) a spade blade,
  (d) a substantially straight tubular neck rigidly and structurally attached at an angle to the front face of the blade,
  wherein the free end of the neck is tapered and matched to friction fit into the socket,
  (e) a pair of off-set holes, one passing through both sides of the socket and the other hole passing through both sides of the tapered portion of the neck, and
  (f) a locking pin means inserted into the pairs of holes to lock the neck into the socket,
  wherein the off-set between the holes is sufficient to pull the tapered neck into the socket when the pin means is inserted through the pair of holes.

2. The spade of claim 1 wherein foot rest steps are provided on the top edge of the blade one on each side, each pitched downwardly toward the outside of the top edge of the top of the spade blade sufficient to avoid the inside of a person's knee touching the tubular handle when the foot is pressed on the step.

3. The spade of claim 2 wherein the pitch of the footrest steps is in the range of five to twenty degrees from the horizontal.

4. The spade blade of claim 1 wherein a shield support cover member is structurally and rigidly attached to the front face of the blade covering the neck and structurally and rigidly attached to the neck.

5. The spade of claim 1 wherein the grip handle is constructed in a "D" shape with the hand grip on the straight side and with straight tubular sections extending at right angles from the ends of the hand grip and connecting into the curved portion of the grip handle which in turn is structurally attached to the handle body.

6. The spade of claim 1 wherein the grip handle and the handle body are of tubular construction.

7. The spade of claim 1 wherein the socket comprises a ring member force fitted into the lower end of the handle body, and the end edges of the handle body bent over the ring to secure it in place.

8. The space of claim 1 wherein the locking pin means is a rolled spring pin.

9. A space comprising:
  (a) a tubular "D" shaped grip handle with a hand grip on the straight side,
  wherein straight tubular sections extend at right angles from the hand grip connecting into the curved portion of the grip handle,
  (b) a tubular handle body rigidly and structurally attached and extending from the middle of the curved portion of the grip handle,
  wherein the free end of the tubular handle terminates in a tubular socket,
  (c) a spade blade,
  (d) foot rest steps on the top edge of the blade, one on each side, pitched downwardly toward the outside of the edge of the top of the spade blade, the pitch being sufficient to avoid the inside of the users knee from touching the tubular handle when the foot is pressed on the step, (e) a substantially straight tubular neck rigidly and structurally attached at an angle to the front face of the blade, wherein the free end of the neck is tapered and matched to friction fit into the socket, (f) a pair of off-set holes, one passing through both sides of the socket and the otherhole passing through both sides of the tapered portion of the neck, and (g) a locking spring pin means that exerts a bias pressure against the opposite edges of the off-set holes, wherein the off-set between the holes is sufficient to have the bias pressure pull the tapered neck into the socket when the spring pin means is inserted through the pair of holes.

10. The spade of claim 9 wherein a shield support cover member is structurally and rigidly attached to the front face of the blade covering the neck and structurally and rigidly attached to the front face of the blade covering the neck and structurally and rigidly attached to the neck.

* * * * *